(12) United States Patent
Di Franco

(10) Patent No.: US 7,712,813 B2
(45) Date of Patent: May 11, 2010

(54) EXPANDABLE TRAILER

(75) Inventor: Benito Di Franco, Caledon (CA)

(73) Assignee: Peel Truck & Trailer Equipment Ltd, Mississauga, Ontario (CA)

( * ) Notice: Subject to any disclaimer, the term of this patent is extended or adjusted under 35 U.S.C. 154(b) by 340 days.

(21) Appl. No.: 11/496,493

(22) Filed: Aug. 1, 2006

(65) Prior Publication Data
US 2007/0170740 A1 Jul. 26, 2007

(30) Foreign Application Priority Data
Jan. 23, 2006 (CA) .................................... 2533682

(51) Int. Cl.
B60P 3/355 (2006.01)
(52) U.S. Cl. .................................... 296/26.14; 296/171
(58) Field of Classification Search ................ 296/165, 296/171, 172, 173, 175, 176, 26.12, 26.13, 296/26.14, 26.15; 52/67
See application file for complete search history.

(56) References Cited

U.S. PATENT DOCUMENTS

| | | | |
|---|---|---|---|
| 1,279,819 A | 9/1918 | Zingsheim et al. | |
| 2,704,223 A | 3/1955 | Houdart | |
| 2,732,251 A | 1/1956 | Meaker | |
| 2,813,747 A | 11/1957 | Rice, Jr. | |
| RE24,452 E * | 4/1958 | Meaker | 296/175 |
| 2,842,972 A | 7/1958 | Houdart | |
| 2,901,282 A | 8/1959 | Meaker | |
| 3,106,750 A | 10/1963 | Jarman | |
| 3,169,280 A | 2/1965 | Jarman | |
| 3,719,386 A | 3/1973 | Puckett et al. | |
| 4,049,310 A | 9/1977 | Yoder | |
| 4,500,132 A | 2/1985 | Yoder | |
| 4,930,837 A | 6/1990 | Marsh et al. | |
| 5,061,001 A * | 10/1991 | Madden et al. | 296/26.12 |
| 5,090,749 A | 2/1992 | Lee | |
| 5,237,782 A | 8/1993 | Cooper | |

(Continued)

FOREIGN PATENT DOCUMENTS

CA 2190988 5/1997

OTHER PUBLICATIONS http://army-technology.com/contractors/vehicles/2mb-intl/2mb-intl3.html (downloaded Dec. 7, 2005).

(Continued)

*Primary Examiner*—Jason S Morrow
(74) *Attorney, Agent, or Firm*—Sullivan & Worcester LLP; John W. Ryan

(57) ABSTRACT

An expandable trailer comprising a chassis, at least one pair of extendable supports, at least one pair of horizontal floor sections and at least one pair of floor elements. Each support is extendable laterally outwardly to a respective side of a central longitudinal axis of the chassis. The horizontal floor sections of each pair of horizontal floor sections are spaced apart laterally and each have an outer rail which is coupled to a corresponding one of the supports. The floor elements are pivotally coupled to each other and to the floor sections. Upon extension of the extendable supports from a retracted position to an open, extended position, the horizontal floor sections move laterally outwardly to extend from the chassis and the floor elements move from an upright vertical arrangement to an arrangement where the floor elements lie in horizontal alignment with the floor sections.

18 Claims, 5 Drawing Sheets

U.S. PATENT DOCUMENTS

| | | | |
|---|---|---|---|
| 5,280,985 A | | 1/1994 | Morris |
| 5,291,701 A | * | 3/1994 | Delacollette et al. ............ 52/67 |
| 5,295,430 A | | 3/1994 | Dewald |
| 5,332,276 A | | 7/1994 | Blodgett, Jr. |
| 5,333,420 A | | 8/1994 | Eden |
| 5,984,396 A | | 11/1999 | Schneider |
| 6,003,919 A | | 12/1999 | Shook |
| 6,048,167 A | | 4/2000 | Lesmeister et al. |
| 6,113,174 A | * | 9/2000 | McPherson .............. 296/26.15 |
| 6,116,671 A | | 9/2000 | Schneider |
| 6,135,525 A | | 10/2000 | Amann |
| 6,209,939 B1 | | 4/2001 | Wacker |
| 6,286,883 B1 | | 9/2001 | Schneider et al. |
| 6,293,612 B1 | | 9/2001 | Crean |
| 6,712,414 B2 | * | 3/2004 | Morrow ................... 296/26.01 |
| 6,772,563 B2 | * | 8/2004 | Kuhn ........................... 52/67 |
| 6,851,734 B2 | | 2/2005 | Findley |
| 6,969,105 B2 | | 11/2005 | Rincoe |
| 7,290,372 B2 | * | 11/2007 | Aust et al. ..................... 52/67 |
| 2003/0115808 A1 | * | 6/2003 | Morrow ......................... 52/64 |
| 2006/0145499 A1 | * | 7/2006 | Boon ...................... 296/26.14 |
| 2007/0228692 A1 | * | 10/2007 | Kern et al. .................. 280/403 |

OTHER PUBLICATIONS http://centuryindustries.com/Expandable%20Side%20Trailers.htm (downloaded Dec. 7, 2005).

http://www.kytrailer.com/ktt/gal.classroom.cfm (downloaded Dec. 7, 2005).

* cited by examiner

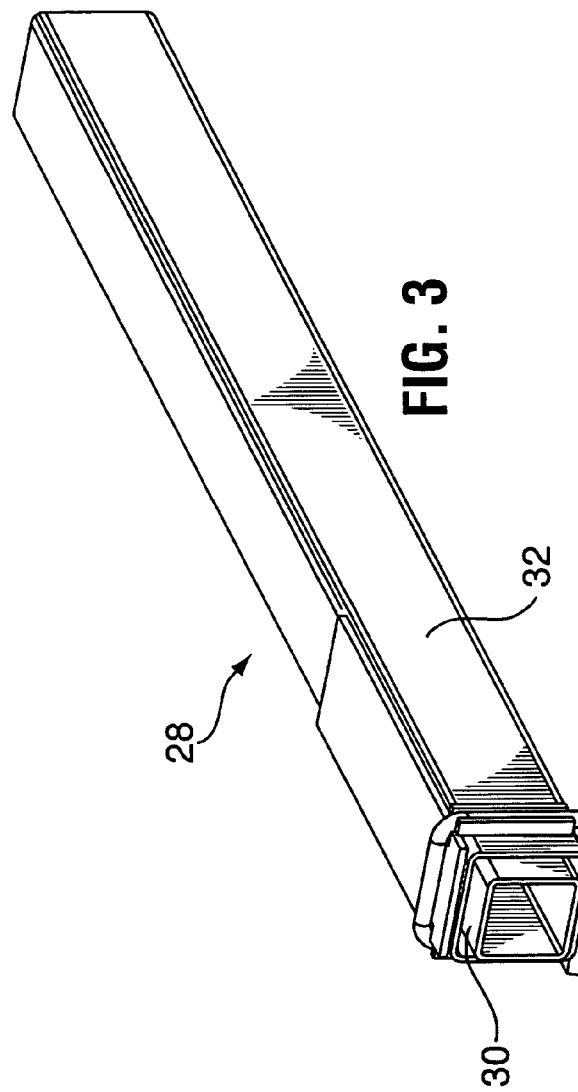
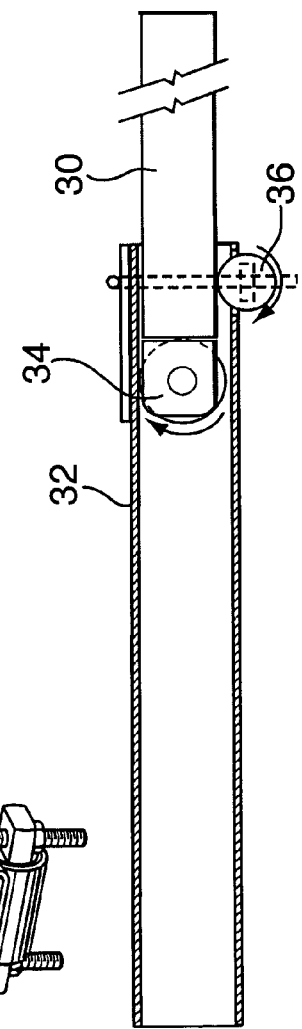
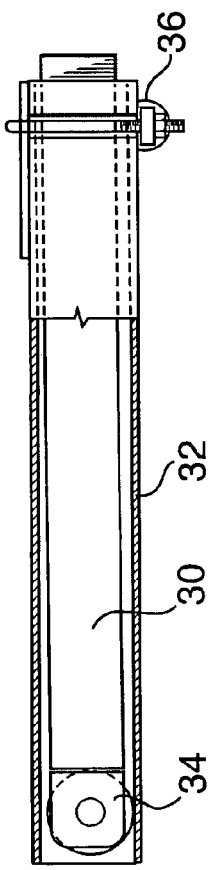
FIG. 3
FIG. 4
FIG. 5

EXPANDABLE TRAILER

FIELD OF THE INVENTION

The present invention relates to expandable trailers.

BACKGROUND OF THE INVENTION

Expandable trailers are often used as house trailers where it is useful be able to collapse a trailer into a more easily transportable form. Quite often, in order to have a structurally stable expandable portion of the trailer, the trailer interior must receive the expandable portion when in the collapsed or retracted position. This can be quite inconvenient as the expandable portion may obstruct the trailer interior and make it difficult to position furniture and the like. Examples of such trailers are disclosed in U.S. Pat. No. 5,280,985 (Morris) and U.S. Pat. No. 5,237,782 (Cooper).

This problem has been addressed in part by U.S. Pat. No. 2,901,282 (Meaker) which discloses a telescopically collapsible house trailer in which the trailer interior is left completely unobstructed. The expandable portion comprises foldable floor elements which are folded up into parallel retracted position at one side of the trailer when it is being transported. When the trailer is expanded, these floor elements fold out to form the expanded portion. Although the trailer interior is not obstructed by the expandable portion, this trailer construction does have a number of drawbacks. The expandable portion cannot support any furniture or the like during transport as the floor elements must be folded up into the retracted position. In addition, as only one side of the trailer supports the expandable portion, balance may also be a concern when the trailer is expanded, particularly when containing heavy loads.

Thus, there exists a need for an expandable trailer with increased stability and improved supports so that the expanded portion of the trailer remains level. Preferably, such an expandable trailer would be able to store furniture and the like in the expandable portion when the trailer is in a retracted position.

SUMMARY OF THE INVENTION

According to a first broad aspect of the invention there is disclosed an expandable trailer comprising: a central enclosure defining a maximum interior height of the trailer; a chassis having a central longitudinal axis for supporting the central enclosure thereon; at least one horizontal rectangular floor section, having an inner longitudinal edge and a rail parallel to the axis, the inner longitudinal edge of the floor section aligned parallel to the axis and between its corresponding rail and the axis; and at least one rectangular floor element, having a first longitudinal edge pivotally coupled to the inner longitudinal edge of a corresponding one of the at least one floor sections, a distance between the first longitudinal edge and a second longitudinal edge of the at least one floor element opposite to the first longitudinal edge being substantially greater than one half of the maximum interior height of the trailer; at least one support, comprising an inner member and an outer member, the outer member having an inner opening that extends substantially along a length of the outer member, the inner member housed within the opening and coupled to the rail of a corresponding one of the at least one floor section, the at least one support being extendable: from a storage position of the trailer in which the inner longitudinal edge of the at least one floor section is disposed proximate to the axis and the outer rail of the at least one floor section is disposed substantially over the chassis, to an extended position of the trailer in which the at least one floor element is disposed substantially co-planar to the corresponding at least one floor section and the outer rail of the corresponding floor section extends laterally beyond the chassis.

According to a second broad aspect of the invention there is disclosed the expandable trailer according to the previous paragraph, further comprising a plurality of leveling jacks for leveling the trailer when it is parked.

In accordance with yet another aspect of the invention, there is provided apparatus comprising a plurality of expandable trailers as described above, a plurality of levelling jacks for levelling the trailers when parked and at least one coupling for connecting each one of the plurality of expandable trailers to adjacent expandable trailers. The levelling jacks are adapted to horizontally align respective floor sections of adjacent expandable trailers.

With this construction of expandable trailer, because the floor sections remain horizontally aligned during the transition from the retracted position where the floor elements are in an upright vertical arrangement to the open position where the floor elements lie in horizontal alignment with the floor sections, objects such as furniture and the like may be stored thereon during transport. Furthermore, as the trailer expands outwardly to each side of the chassis, the entire structure remains balanced. The construction of this expandable trailer also ensures that the expanded portions remain level.

BRIEF DESCRIPTION OF THE DRAWINGS

These and other advantages of the invention will become apparent upon reading the following detailed description and upon referring to the drawings in which:

FIG. 3 is a partial perspective view of an extendable support of the expandable trailer of FIGS. 1 and 2 in retracted position;

FIG. 4 is a side view of the extendable support of FIG. 3 in open, extended position;

FIG. 5 is a side view of the extendable support of FIG. 3 in retracted position;

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

Figure 1:
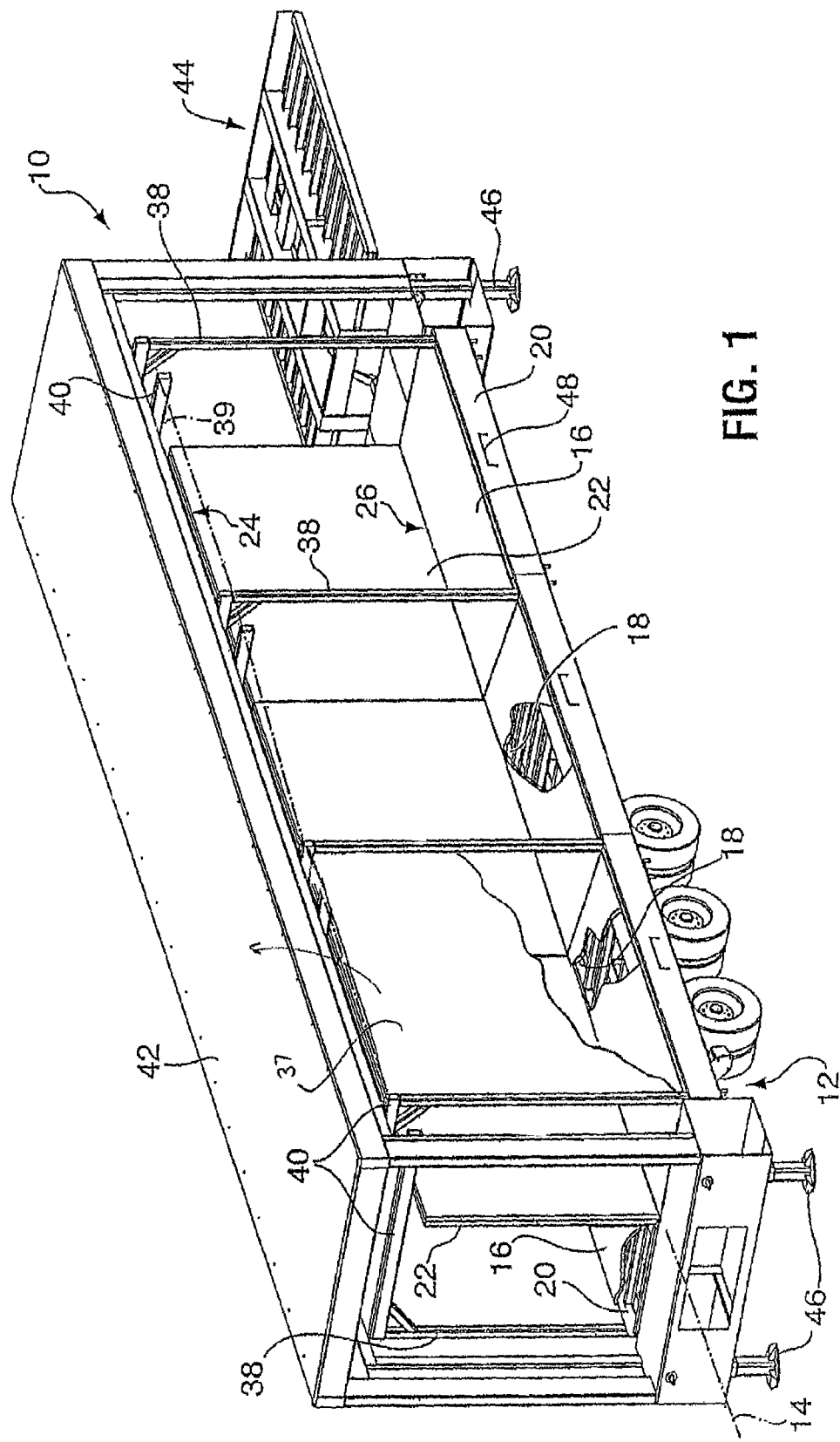
FIG. 1 is a perspective view from the side and rear of an embodiment of an expandable trailer in a retracted position in accordance with the invention.
Figure 2:
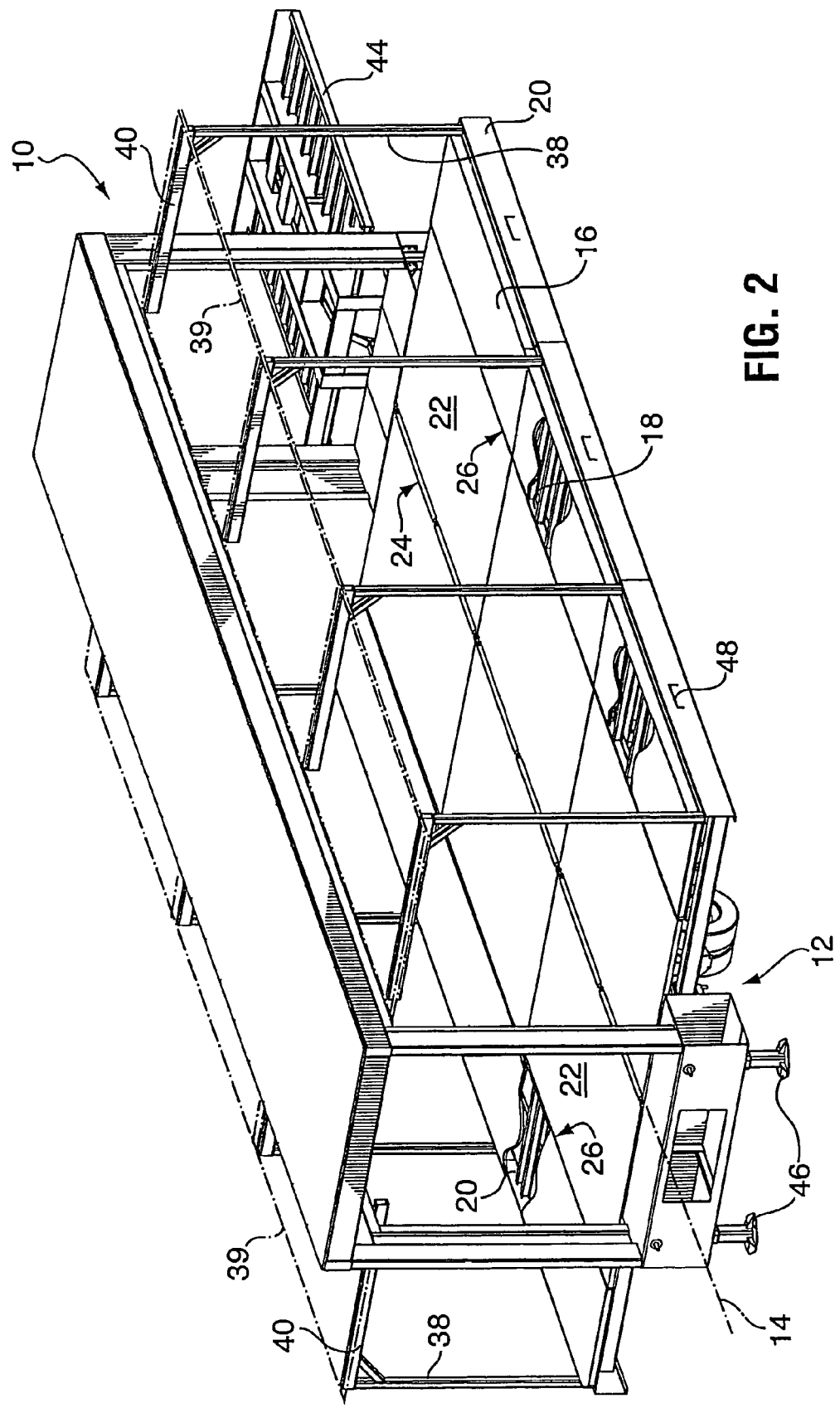
FIG. 2 is a similar perspective view from the side and rear of an embodiment of an expandable trailer in an open, extended position in accordance with the invention.
Figure 6:
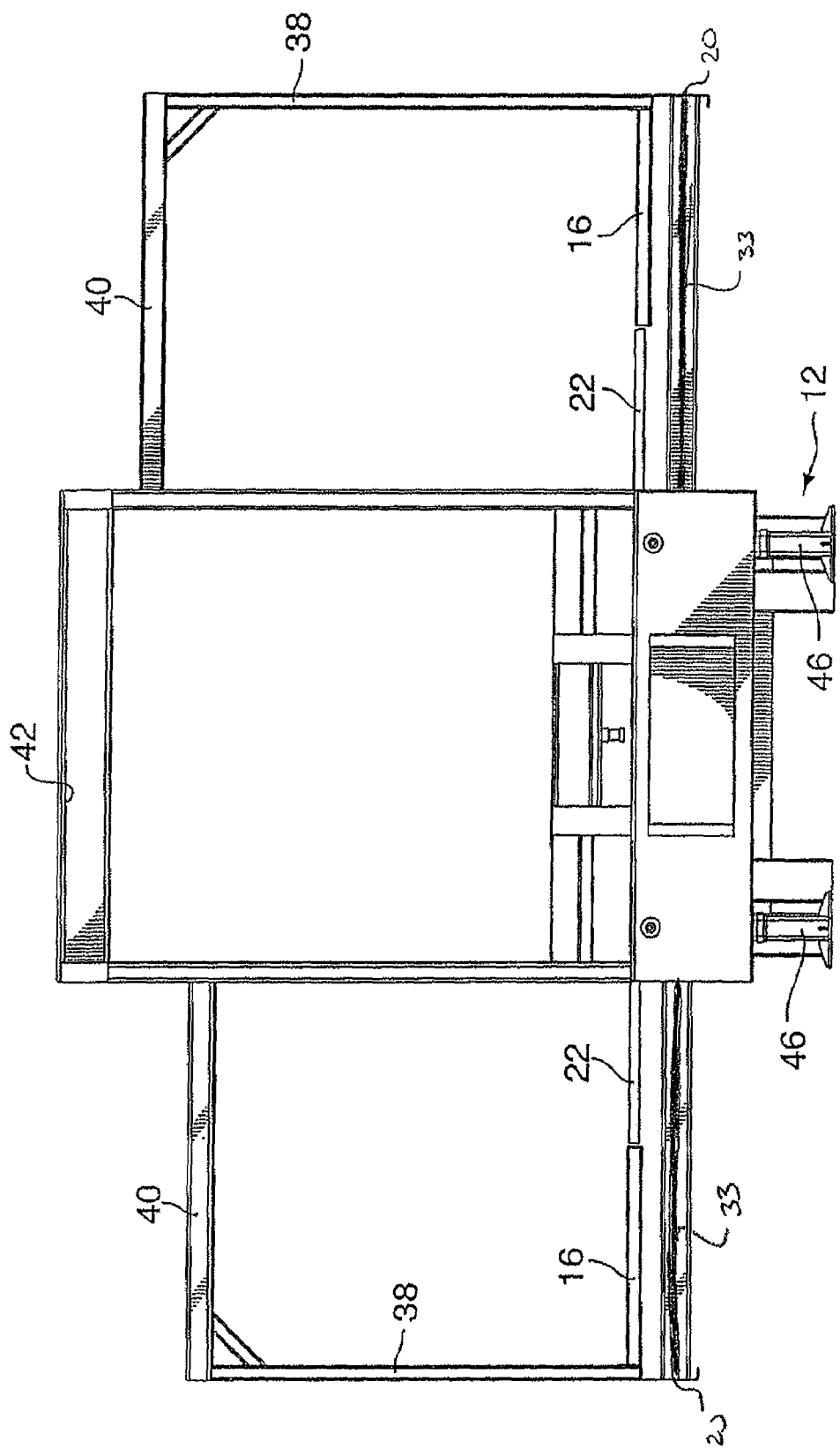
FIG. 6 is a rear elevation view of the expandable trailer of FIGS. 1 and 2 in open, extended position.

FIG. 1 illustrates an expandable trailer 10 in a retracted position and FIG. 2 illustrates the expandable trailer 10 in an open position. The expandable trailer 10 illustrated in FIGS. 1 and 2 comprises a chassis 12 having a central longitudinal axis 14 and at least one pair of extendable supports (not shown). The extendable supports are each extendable laterally outwardly to respective sides of the central longitudinal axis 14 of the chassis. The extendable supports will be described in more detail with reference to FIGS. 3, 4 and 5 later in this document.

The extendable supports support at least one pair of rectangular floor sections 16. Each floor section 16 of the pair is spaced laterally with respect to the other floor section 16 of the pair to either side of the central longitudinal axis 14 of the chassis 12. Each of the floor sections 16 has an inner longitudinal edge 18 and an outer rail 20, the outer rail 20 being coupled to an outer end of a corresponding one of the at least one pair of extendable supports.

The floor sections 16 may each comprise a planar member supported by a frame having a plurality of lateral support bars, as shown in the cut-away portions of FIGS. 1 and 2. This frame does not have to be in direct contact with the extendable supports.

At least two rectangular floor elements 22 are pivotally coupled together along respective first longitudinal edges (indicated generally by reference number 24). Each floor element 22 is pivotally coupled at a second longitudinal edge (indicated generally by reference number 26) to a corresponding inner longitudinal edge 18 of one of the at least two floor sections. Like the floor sections 16, the floor elements 22 may each comprise a planar member supported by a frame having a plurality of support bars (not shown).

Upon extension of the extendable supports from a retracted position to an open, extended position, the horizontal floor sections 16 move laterally outwardly to extend from the chassis 12 and the floor elements 22 move from a retracted position where the floor elements 22 are in an upright vertical arrangement (as in FIG. 1) to an open, extended position where the floor elements lie in horizontal alignment with the floor sections (as in FIG. 2).

When in the open position, there may be a small clearance (approximately ¾") between the second longitudinal edge 26 of each floor element 22 and the inner longitudinal edge 18 of the corresponding horizontal floor section 16. Likewise, when in the open position, there may be a small clearance (approximately ¾") between the first longitudinal edges 24 of the floor elements 22. In the open position, each of the floor elements 22 may be supported on a lip extending from the corresponding floor section 16 (not shown).

Figure 7:
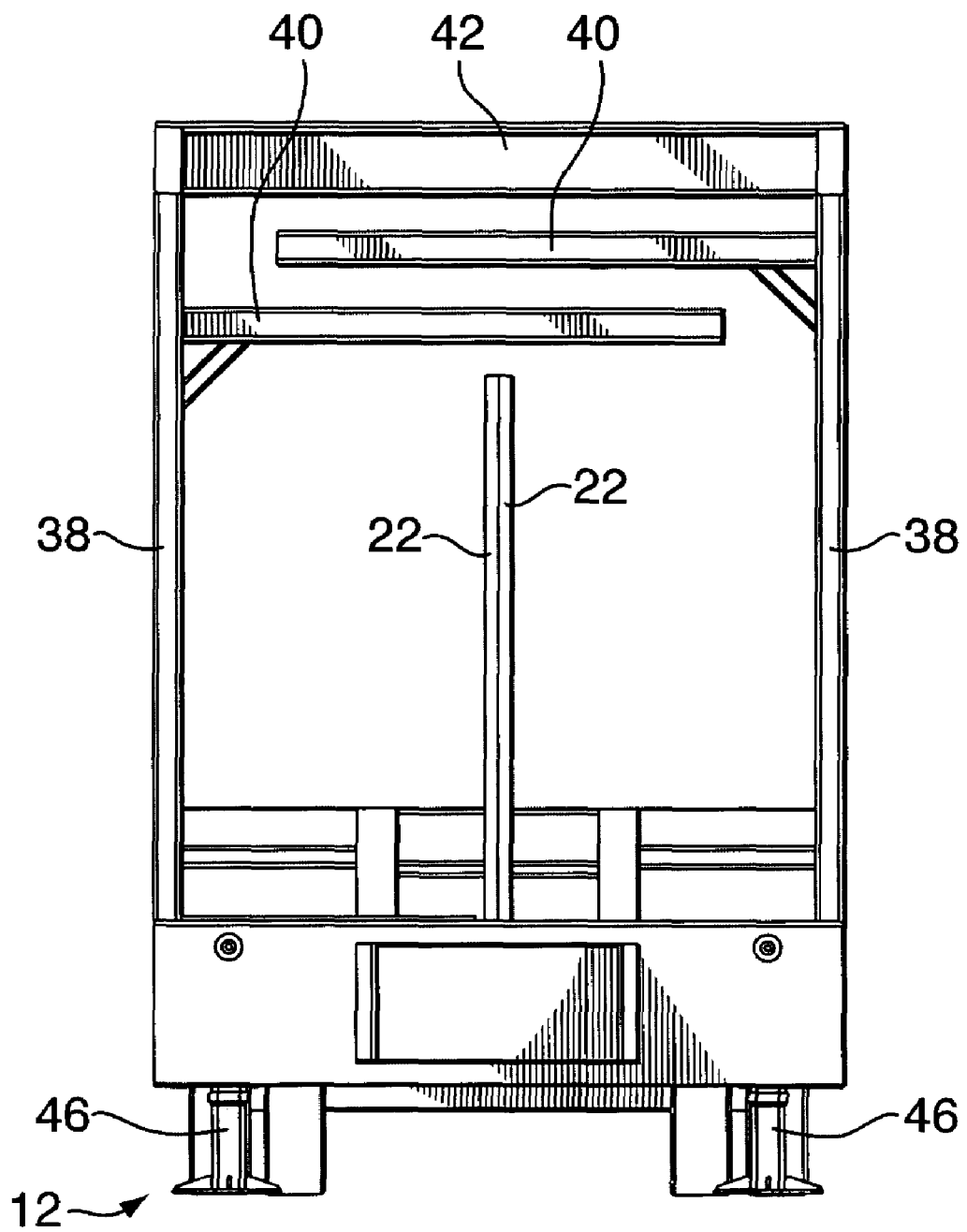
FIG. 7 is a rear elevation view of the expandable trailer of FIGS. 1 and 2 in retracted position.

Preferably, as can be seen in FIGS. 1 and 7, the floor elements 22 extend upwardly from a lateral center of the chassis (in line with longitudinal axis 14) when in the retracted position. It should be understood, however, that the floor elements 22 may extend upwardly from any suitable part of the chassis 12.

Referring now to FIGS. 3, 4 and 5, each of the extendable supports 28 comprises an inner member 30 and an outer member 32. The outer member 32 has an inner opening that extends along the length of the outer member 32 for receiving the inner member 30. The inner member 30 lies substantially within the outer member 32 when in the retracted position (as shown in FIGS. 3 and 5) and extends telescopically from the outer member 32 when in the extended position (as shown in FIG. 4).

Each of the extendable supports 28 further comprises a first roller 34 fastened to a first end of the inner member 30, a diameter of the first roller 34 being slightly smaller than the width of the outer member 32. The first roller 34 rolls along a bottom surface of the inner opening as the inner member 30 is driven out of the outer member 32.

Each of the extendable supports further comprises a second roller 36 fastened to the outer member 32 at an end distal to the first end of the inner member 30 when the extendable support 28 is in retracted position. The second roller 36 is fastened so that a portion of the roller lies within the inner opening of the outer member 32 and a bottom surface of the inner member 30 is supported as it is driven out of the outer member 32 to the extended position. The portion of the second roller 36 that lies within the inner opening can be increased and decreased.

The inner member 30 may be tubular and generally square in cross-section. Likewise, the outer member 32 may be generally square in cross-section.

At least one actuator 33 is associated with the extendable supports 28 to move them from a retracted position to an extended position. The at least one actuator may accomplish this by exerting an outward lateral force on the outer rail 20 of each floor section.

The at least one actuator 33 may be a motor-driven screw jack, although it should be understood that any suitable actuator may be used. The screw jack may drive a rod and piston assembly wherein the rod is coupled to one of the outer rails 20 of the floor sections 16. This rod and piston assembly may extend parallel to the extendable supports 28. The screw jack may be coupled to a gear box and at least one electric motor. A number of screw jacks may be used and driven by the same gear box and motor combination.

It should be understood that any suitable type of extendable support may be used and the invention is not limited to the type of extendable support shown in FIGS. 3, 4 and 5.

At least two side walls 37 may extend upwardly from outer edge portions of respective ones of the floor sections 16. These walls 37 may be supported by the vertical supports 38 shown clearly in FIGS. 1 and 2. Alternatively, these side walls 37 may be implemented without vertical supports 38. At least two roof sections 39 are attached to the upper edges of the at least two side walls 37. The roof sections 39, shown in phantom in FIGS. 1 and 2, are supported by roof supports 40. Each of the side walls 37 may comprise at least one removable panel as shown in FIG. 1 for the purposes of, for example, interchanging different types of panel (e.g. with window, without window).

When the extendable supports 28 are in the retracted position, the roof sections one side lies beneath the roof section of the other side of the trailer, as shown in the Figures. Preferably the chassis comprises a central static roof section 42 and the roof sections 39 both lie beneath the roof section 42 of the chassis 12 when the extendable supports 28 are in the retracted position. The static roof portion 42 may supported by additional vertical supports 38 at each corner, as shown in the Figures. The side walls on opposite sides of the trailer may be different heights so that the first and second roof sections 39 may lie beneath the static roof portion 42 as shown in the Figures.

A platform 44 may extend from a back end of the chassis. The platform 44 may be pivotally mounted to fold up into a vertical arrangement when the trailer is in motion. This platform may be used for any suitable purpose, for example additional storage.

When the expandable trailer 10 is parked, a plurality of conventional levelling jacks 46 can be used to level the trailer 10.

According to another embodiment of the invention, a plurality of expandable trailers similar to the expandable trailer described previously may be connected together by a suitable coupling means 48. This connection may be facilitated by using respective levelling jacks to horizontally align respective floor sections of adjacent expandable trailers.

It is apparent that there has been provided in accordance with the invention an expandable trailer that fully satisfy the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. An expandable trailer comprising:
   a central enclosure defining a maximum interior height of the trailer;
   a chassis having a central longitudinal axis for supporting the central enclosure thereon;
   at least one horizontal rectangular floor section, having an inner longitudinal edge and a rail parallel to the axis, the inner longitudinal edge of the floor section aligned parallel to the axis and between its corresponding rail and the axis; and
   at least one rectangular floor element, having a first longitudinal edge that pivotally coupled to the inner longitudinal edge of a corresponding one of the at least one floor sections, a distance between the first longitudinal edge and a second longitudinal edge of the at least one floor element opposite to the first longitudinal edge being substantially greater than one half of the maximum interior height of the trailer;
   at least one support, comprising an inner member and an outer member, the outer member having an inner opening that extends substantially along a length of the outer member, the inner member housed within the opening and coupled to the rail of a corresponding one of at least one floor sections, the at least one support being extendable
      from a storage position of the trailer in which the inner longitudinal edge of the at least one floor section is disposed proximate to the axis and the outer rail of the at least one floor section is disposed substantially over the chassis,
      to an extended position of the trailer in which the at least one floor element is disposed substantially co-planar to the corresponding at least one floor section and the outer rail of the corresponding floor section extends laterally beyond the chassis.

2. The expandable trailer according to claim 1, wherein the at least one floor element is disposed substantially parallel to and vertically over the axis, when in the storage position.

3. The expandable trailer according to claim 1, wherein, when in the extended position, a clearance exists between the first longitudinal edge of the at least one floor element and the inner longitudinal edge of the corresponding at least one floor section.

4. The expandable trailer according to claim 1, wherein in the storage position the inner member lies substantially within the outer member and in the extended position, the inner member extends beyond the outer member.

5. The expandable trailer according to claim 1, wherein the inner member is coupled to the rail by a roller, a diameter of the roller being slightly smaller than the width of the outer member.

6. The expandable trailer according to claim 5, wherein the roller is positioned to roll on a bottom surface of the inner member as the support is extended.

7. The expandable trailer according to claim 1, wherein at least one actuator is associated with a corresponding support to move the trailer from the storage position to the extended position.

8. The expandable trailer according to claim 7, wherein the at least one actuator exerts an outward lateral force on the rail of one of the at least one floor sections.

9. The expandable trailer according to claim 7, wherein the at least one actuator comprises a screw jack.

10. The expandable trailer according to claim 1, further comprising at least one roof section extending above a corresponding floor section and at least one side wall extending upwardly substantially over the rail from the at least one floor section to the corresponding at least one roof section.

11. The expandable trailer according to claim 10, wherein the chassis comprises at least one static roof section forming part of the central enclosure disposed substantially over one of the at least one floor sections and defining the maximum interior height of the trailer.

12. The expandable trailer according to claim 11, wherein, in the storage position, the at least one roof section lies beneath the at least one static roof section.

13. The expandable trailer according to claim 1, further comprising a platform extending from an end of the chassis.

14. The expandable trailer according to claim 1, further comprising a plurality of leveling jacks for leveling the trailer when it is parked.

15. The expandable trailer according to claim 1, wherein a plurality of the at least one rectangular floor sections is aligned end to end substantially parallel to the axis.

16. The expandable trailer according to claim 1, further comprising:
   the at least one horizontal rectangular floor sections being organized in pairs, each floor section in a pair disposed on opposite sides of the axis;
   the at least one rectangular floor elements being organized in pairs, each floor element having a second longitudinal edge that is pivotally coupled to the second longitudinal edge of the other floor element of the pair; and
   the at least one supports being organized in pairs.

17. The expandable trailer according to claim 16, wherein, in the extended position, a clearance exists between the second longitudinal edge of corresponding ones of the pair of floor elements.

18. The expandable trailer according to claim 16, further comprising at least one pair of roof sections extending above a corresponding pair of floor sections and at least one pair of side walls extending upwardly substantially over the rail from at least one of the pair of floor sections to a corresponding one of the at least one pair of roof sections, wherein, in the storage position, a first one of the at least one pair of roof sections is positioned substantially beneath a second one of the at least one pair of roof sections.

* * * * *